United States Patent
Grimaldo et al.

(10) Patent No.: US 10,792,985 B1
(45) Date of Patent: Oct. 6, 2020

(54) DRAIN APPARATUS FOR USE WITH VEHICLE SUNROOFS

(71) Applicant: AISIN TECHNICAL CENTER OF AMERICA, INC., Northville, MI (US)

(72) Inventors: Jacob Grimaldo, Northville, MI (US); Joel Runyan, Northville, MI (US); Michael Mixon, Northville, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 16/359,072

(22) Filed: Mar. 20, 2019

(51) Int. Cl.
| | | |
|---|---|---|
| *B60J 7/00* | (2006.01) | |
| *B60J 3/02* | (2006.01) | |
| *B60J 7/043* | (2006.01) | |

(52) U.S. Cl.
CPC ........... *B60J 7/0015* (2013.01); *B60J 7/0084* (2013.01); *B60J 7/043* (2013.01)

(58) Field of Classification Search
CPC .............................. B60J 7/0084; B60J 7/0015
USPC .................................................. 296/213, 214
See application file for complete search history.

(56) References Cited

U.S. PATENT DOCUMENTS

| | | | |
|---|---|---|---|
| 8,845,013 B2 | 9/2014 | Lee | |
| 9,004,146 B2 | 4/2015 | Zeo et al. | |
| 9,561,708 B2 * | 2/2017 | Yukisada | ............... B60J 1/2052 |
| 2012/0267465 A1 | 10/2012 | Kitani et al. | |

FOREIGN PATENT DOCUMENTS

| | | |
|---|---|---|
| DE | 10 2014 005 476 A1 | 10/2015 |
| KR | 10-2017-0030942 | 3/2017 |

* cited by examiner

*Primary Examiner* — Dennis H Pedder
(74) *Attorney, Agent, or Firm* — Oblon, McClelland, Maier & Neustadt, L.L.P.

(57) ABSTRACT

Drain apparatus for use with vehicle sunroofs are disclosed. A disclosed assembly for a vehicle sunroof includes a sunshade axle configured to receive a sunshade. The assembly also includes a sunroof drain supported by a component of the vehicle sunroof and configured to convey a fluid away from the vehicle sunroof. The sunroof drain includes a body that defines a fluid cavity and a bracket coupled to the body. The bracket is configured to hold the sunshade axle.

13 Claims, 9 Drawing Sheets

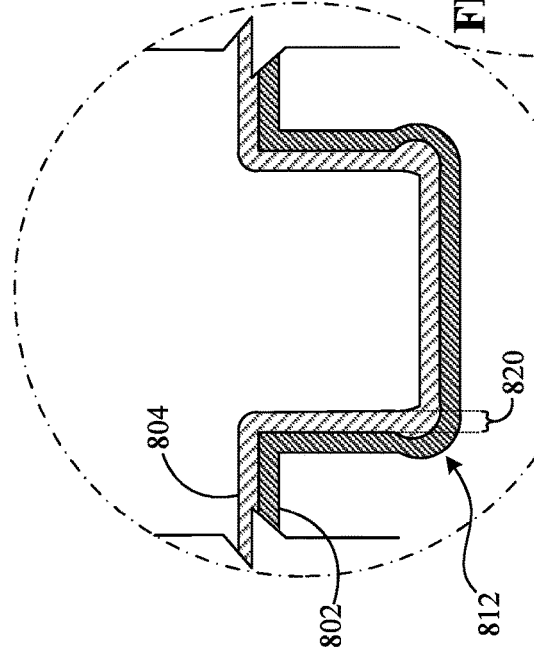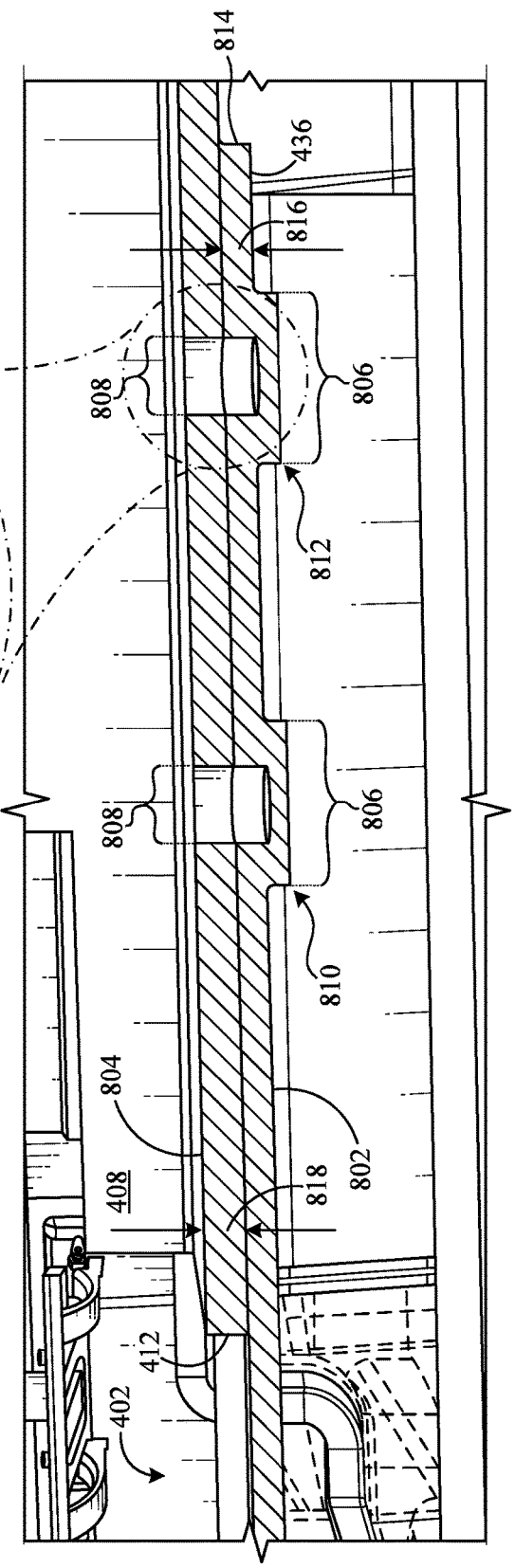

US 10,792,985 B1

DRAIN APPARATUS FOR USE WITH VEHICLE SUNROOFS

FIELD OF THE DISCLOSURE

This disclosure relates generally to vehicles and, more particularly, to drain apparatus for use with vehicle sunroofs.

BACKGROUND

Vehicle sunroofs typically employ drains that are configured to catch water and convey the water away from a vehicle cabin. For example, a sunroof drain includes a fluid cavity that catches the water and drains the water therefrom such that the water flows through a tube extending from the fluid cavity to an exterior of the vehicle to expel the water. In this manner, these drains prevent water from entering a vehicle cabin and/or otherwise prevent a sunroof from leaking during certain weather conditions.

Some vehicle sunroofs also employ sunshade axles and sunshade tensioners, which facilitate sunshade operation. For example, a sunshade of a sunroof may be positioned on a sunshade axle such that a vehicle occupant can wind the sunshade on the sunshade axle and unwind the sunshade to cover a sunroof panel. Further, a sunshade tensioner is configured to apply a force or pressure on the sunshade to prevent the sunshade from wrinkling, which may be desirable to the vehicle occupant. In this manner, such sunshade axles and tensioners improve comfort of vehicle occupant during certain vehicle lighting conditions. To ensure a sunshade functions properly, an associated sunshade axle and sunshade tensioner need to be properly positioned and/or secured in place.

SUMMARY

An example assembly for a vehicle sunroof includes a sunshade axle configured to receive a sunshade. The assembly also includes a sunroof drain supported by a component of the vehicle sunroof and configured to convey a fluid away from the vehicle sunroof. The sunroof drain includes a body that defines a fluid cavity and a bracket coupled to the body. The bracket is configured to hold the sunshade axle.

The foregoing paragraphs have been provided by way of general introduction and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 8A and 8B are cross-sectional views of the example sunroof drain of FIG. 5 along line A-A.

The figures are not to scale. In general, the same reference numbers will be used throughout the drawing(s) and accompanying written description to refer to the same or like parts.

DETAILED DESCRIPTION

Figure 1:
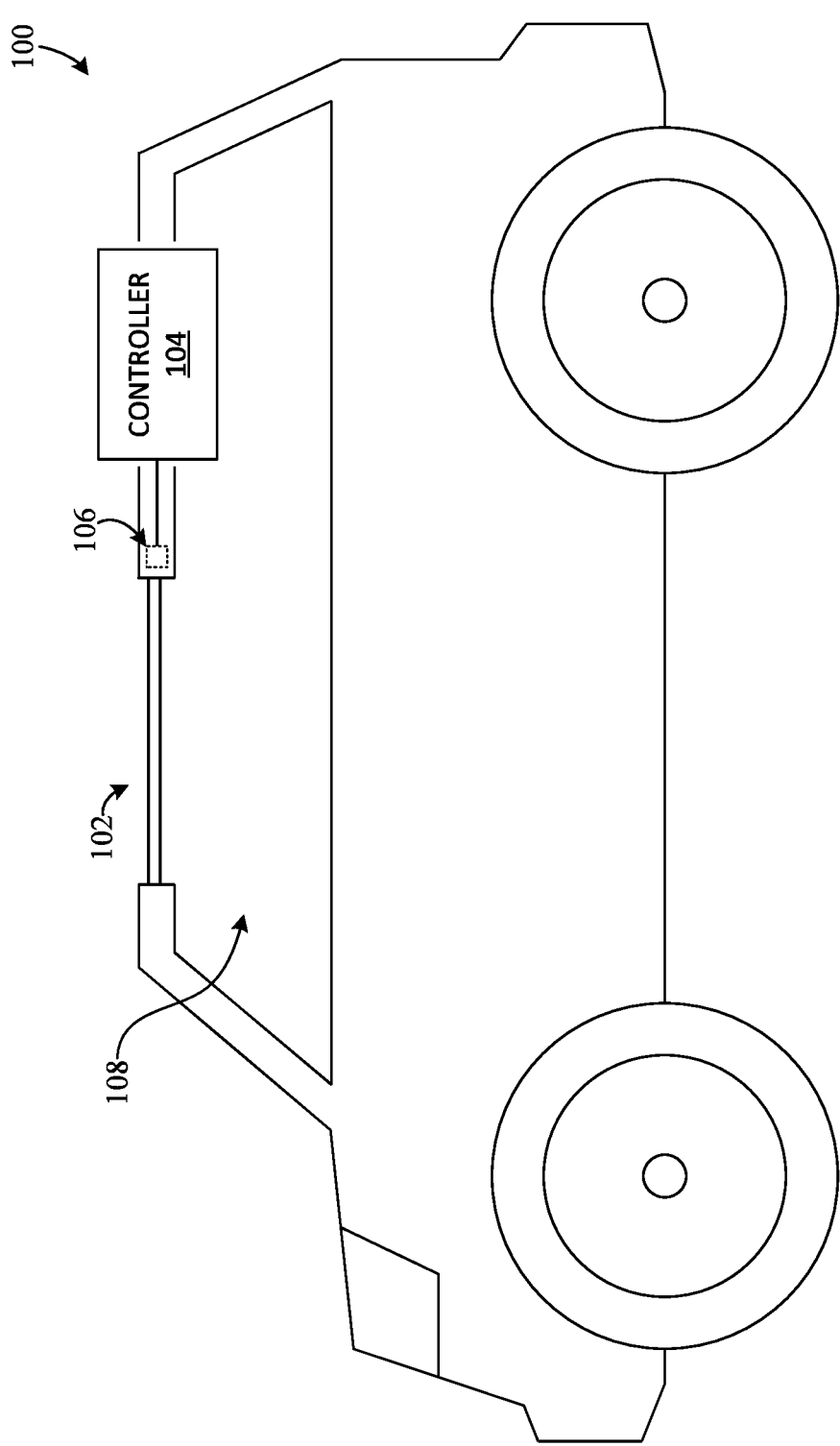
FIG. 1 is a view of an example vehicle in which examples disclosed herein can be implemented.

Some known vehicle sunroofs include known sunshade brackets that are configured to hold a sunshade axle and also act as a tensioner by applying pressure to a sunshade positioned on the sunshade axle. However, to sufficiently support the sunshade axle and/or the sunshade while maintaining a sufficient pressure applied to the sunshade, such known brackets are relatively large, heavy, and expensive to produce. These known sunroofs also typically have known drains that are separate from such known brackets and supported by a different sunroof component. In particular, these known sunroof drains are strictly configured to catch water and convey the water. That is, these known sunroof drains are not configured to hold a sunshade axle and/or a sunshade due to insufficient strength and/or rigidity of such known drains. Additionally, these known sunroofs also typically have rear housings that are mounted on and/or held by sunroof rails. Thus, these known vehicle sunroofs have multiple and/or separate coupling mechanisms to hold respective ones of a sunroof drain, a sunshade axle, a sunshade, a sunshade tensioner, and a sunroof housing. As a result of part complexity associated with these coupling mechanisms, such known vehicle sunroofs are expensive and/or time consuming to produce.

Drain apparatus for use with vehicle sunroofs are disclosed. Examples disclosed herein provide an example drain for a sunroof of a vehicle that is structured and/or configured to catch a fluid (e.g., water) and/or convey the fluid away from the sunroof (e.g., to an exterior of the vehicle), which prevents the sunroof from leaking. The drain is coupled to an example support component (e.g., a sunroof rail) of the vehicle sunroof such that the drain is sufficiently supported and/or secure. In particular, the disclosed drain is configured to couple (e.g., removably couple) to a sunshade axle (e.g., an axle having a sunshade positioned thereon) of the sunroof, as discussed in greater detail below in connection with FIGS. 1-7, 8A, 8B, and 9. In some such examples, the drain includes a first example adaptor (e.g., a first tab positioned on a drain body) that is couple between and/or interposed between a body (e.g., a body defining a fluid cavity) of the drain and the sunshade axle to support and/or carry the sunshade axle. Additionally or alternatively, the disclosed drain is configured to couple (e.g., removably couple) to a sunshade tensioner (e.g., an oblong body that is configured to impart a pressure on the sunshade) associated with the sunshade axle. In some such examples, the drain includes a second example adaptor (e.g., a second tab positioned on the drain body) that is coupled between and/or interposed between the body and the sunshade to support and/or carry the sunshade tensioner. Additionally or alternatively, the disclosed drain is configured to couple (e.g., removably couple) to an example housing (e.g., a rear housing) of the sunroof. In such examples, the drain includes a third example adaptor (e.g., a third tab positioned on the drain body) that is coupled between and/or interposed between the body and the housing to support and/or carry the housing.

Some disclosed examples provide an example drain bracket (e.g., sheet metal) coupled to the body of the drain (e.g., via one or more molding processes), which improves strength and/or rigidity of the drain to enable the drain to sufficiently support such sunroof component(s). In such examples, the drain bracket includes a first sheet portion (e.g., a sheet that is curved and/or angled) that is positioned in and/or extends through a portion (e.g., a central portion or area) of the drain body, thereby coupling the drain bracket to the drain body (e.g., the drain bracket and the drain body form a single-piece or integral component). In particular, the disclosed drain bracket is configured to hold one or more (e.g., all) of the sunshade axle, the sunshade tensioner, and/or the sunroof housing. In such examples, the drain bracket is shaped such that the drain bracket forms and/or defines one or more (e.g., all) of the first disclosed adaptor, the second disclosed adaptor, and/or the third disclosed adaptor. Thus, the disclosed drain bracket is configured to hold one or more (e.g., all) of the sunshade axle, the sunshade tensioner, and/or the sunroof housing. In this manner, disclosed examples incorporate sunshade holding functionality, axle holding functionality, and/or sunroof housing holding functionality into the drain such that the drain sufficiently holds such sunroof component(s), which would have otherwise been unattainable using the above-mentioned known sunroof drains. As a result, compared to the above-mentioned known sunroofs, disclosed examples reduce part complexity and/or costs typically associated with coupling such sunroof components together and/or providing sufficient support to the component(s).

Additionally, in some examples, the disclosed bracket is interposed between the body and the support component of the sunroof such that the bracket couples the body to the support component. In other words, the body is coupled to the support component via the bracket. In such examples, the bracket includes a second sheet portion connected to the first sheet portion and extending along a sheet portion of the support component. In particular, the second sheet portion of the bracket and the sheet portion of the support component form one or more example joints (e.g., one or more clinched joints) that couple the bracket and the support component together, for example, via one or more methods or techniques related to clinching and/or press-forming. As a result, disclosed examples further improve the strength and/or rigidity of the disclosed drain.

FIG. 1 is a view of an example vehicle (e.g., a car, a van, a truck, a sport utility vehicle (SUV), etc.) 100 in which examples disclosed herein can be implemented. According to the illustrated example of FIG. 1, the vehicle 100 includes an example sunroof 102, an example controller 104, and one or more example motors 106. In particular, in some examples, the controller 104 is structured and/or configured to control the sunroof 102 to change a state of the sunroof 102, for example, via the motor(s) 106. In some examples, the controller 104 controls the sunroof 102 to open and/or close the sunroof 102. Additionally, in some examples, the controller 104 controls dimming functionality associated with the sunroof 102, for example, via one or more panels (e.g., electrochromic glass) of the sunroof 102.

The controller 104 of FIG. 1 can be implemented, for example, using one or more electronic control units (ECUs) operatively coupled to the vehicle 100. The controller 104 is sometimes referred to as a sunroof controller and/or a vehicle controller. In particular, the controller 104 is communicatively coupled to the sunroof 102 and/or the motor(s) 106, for example, via a transmission or signal wire, a bus (e.g., a control area network (CAN)), radio frequency, etc. In such examples, the controller 104 provides electrical power and/or one or more control signals or commands to the motor(s) 106, thereby controlling the motor(s) 106 and/or an output thereof (e.g., a torque and/or a force). Further, in some such examples, the controller 104 provides one or more of voltage, current, and/or electrical power to the panel(s) of the sunroof 102 and/or adjusts one or more of the voltage the current, and/or the electrical power, thereby changing a visual characteristic of the panel(s) of the sunroof 102. In this manner, the sunroof panel(s) affect (e.g., absorbs, reflects, scatters, and/or otherwise blocks) an external light (e.g., sunlight) that passes through the sunroof 102 and into a cabin 108 of the vehicle 100.

The sunroof 102 of FIG. 1 can be implemented, for example, using one or more of a panoramic sunroof, a pop-up sunroof, a sliding sunroof, a spoiler sunroof, etc. In particular, the sunroof 102 is structured and/or configured to open and/or close, for examples, in response to receiving the output of the motor(s) 106. As such, at least a portion (e.g., a sunroof panel) of the sunroof 102 is operatively coupled to the motor(s) 106 such that the motor(s) 106 can control movement associated with the portion of the sunroof 102.

The motor(s) 106 of FIG. 1 can be implemented, for example, using one or more electric motors. In particular, the motor(s) 106 are operatively coupled to the sunroof 102 to facilitate opening and/or closing the sunroof 102. For example, in response to receiving the power and/or the control signal(s) or command(s) from the controller 104, the motor(s) 106 cause the sunroof 102 to open and/or close.

Figure 2:
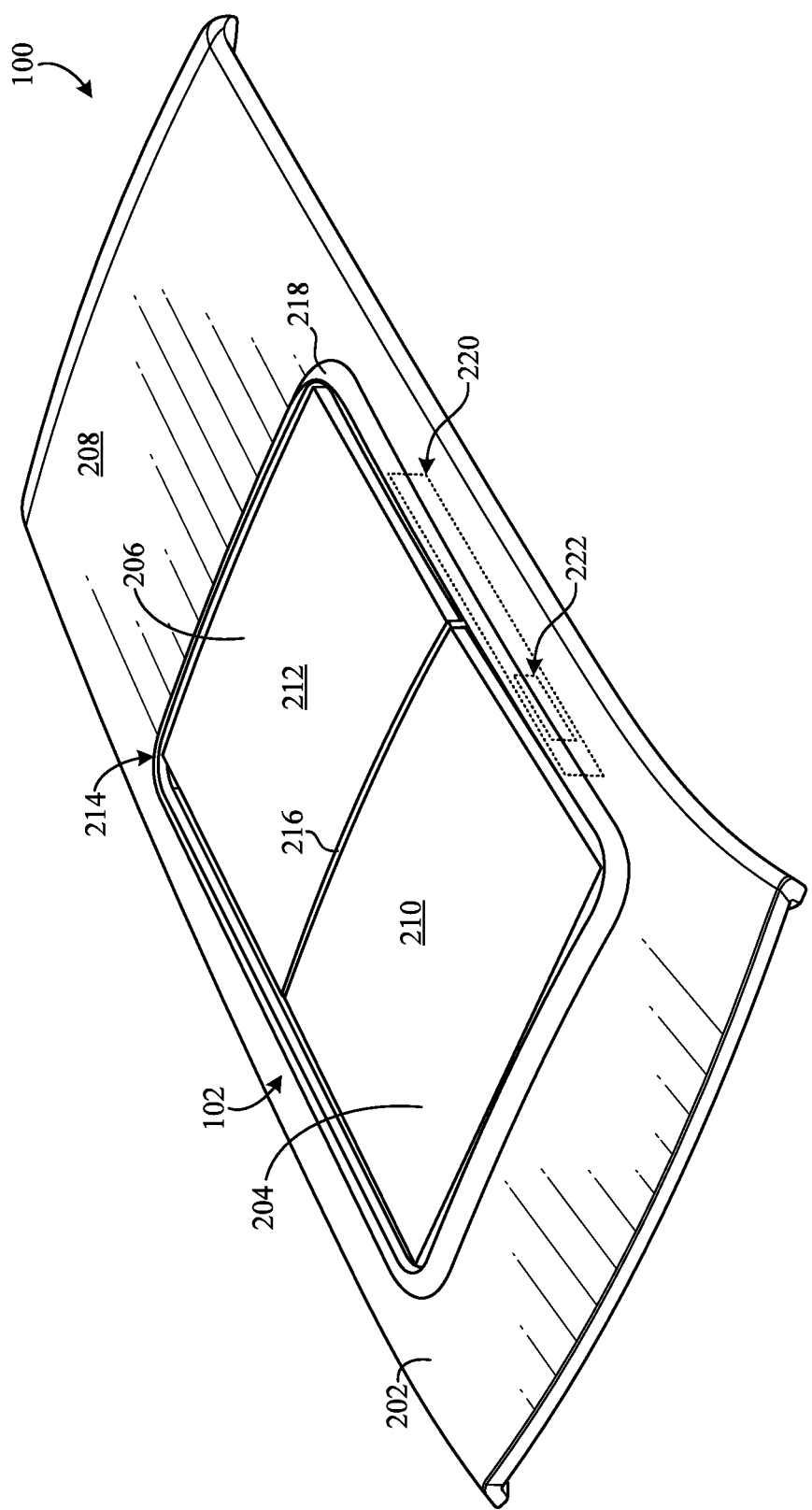
FIG. 2 is a partial-view of the example vehicle of FIG. 1 and shows and example sunroof in which examples disclosed herein can be implemented.

FIG. 2 is a partial-view of the vehicle 100 and shows the sunroof 102. As shown in FIG. 2, the sunroof 102 is positioned on and/or coupled to a roof 202 of the vehicle 100, for example, via one or more example fasteners and/or one or more example fastening methods or techniques. According to the illustrated example of FIG. 2, the sunroof 102 includes one or more example panels (e.g., glass) 204, 206, two of which are shown in this example (i.e., a first panel 204 and a second panel 206). As shown in FIG. 2, the sunroof 102 is in a closed state whereby the first panel 204 is in a first position (e.g., lowered position) thereof. When in the closed state, the sunroof 102 substantially isolates the vehicle cabin 108 from an outside environment. For example, the sunroof 102 and the vehicle roof 202 may form a fluid seal to prevent fluid(s) (e.g., air, water, etc.) and/or foreign matter from entering the vehicle cabin 108 when the sunroof 102 is in the closed state.

In some examples, the vehicle roof 202 and the first and second panels 204, 206 at least partially define an exterior surface 208 of the vehicle 100. As shown in FIG. 2, the first and second panels 204, 206 include respective first and second example surfaces (e.g., outer surfaces) 210, 212. In some examples, the first and second surfaces 210, 212 are substantially adjacent and/or parallel to each other when the sunroof 102 is in the closed state (i.e., when the first panel 204 is in the first position thereof). That is, the first and second surfaces 210, 212 substantially form a single plane and/or a substantially smooth or continuous surface when the first panel 204 is in the first position.

According to the illustrated example of FIG. 2, the vehicle roof 202 includes an example aperture 214 disposed on the exterior surface 208 within which the sunroof 102 is at least partially positioned. In some examples, to prevent the fluid (s) (e.g., air, water, etc.) and/or foreign matter from entering the vehicle cabin (e.g., via the aperture 214), the sunroof 102 includes one or more example sunroof seals (e.g., one or more trim seals) 216, 218, two of which are shown in this example (i.e., a first sunroof seal 216 and a second sunroof seal 218).

In particular, the first panel 204 of FIG. 2 is moveable from the first position to a second example position (e.g., a raised position and/or a tilted position) to provide the open state of the sunroof 102. In some examples, the sunroof 102 includes an example sunroof guide system 220 (as represented by dotted/dashed lines of FIG. 2) that is operatively coupled to the first panel 204 and structured and/or configured to guide movement of the first panel 204 between the first and second positions. In such examples, the sunroof guide system 220 includes and/or is otherwise implemented using, for example, any of one or more rails, one or more guide blocks, one or more brackets, etc., and/or any other appropriate sunroof component associated with guiding movement of the first panel 204 and/or supporting the first panel 204. Additionally, in some examples, the sunroof 102 also includes an example sunroof actuator system 222 (as represented by dotted/dashed lines of FIG. 2) that is operatively coupled to the first panel 204 and structured and/or configured to move the first panel 204 cooperatively with the guide system 220, for example, based on output from the motor(s) 106. In such examples, the sunroof actuator system 222 includes and/or is implemented using, for example, any of one or more moveable shoes, one or more rotatable links, etc., and/or any other appropriate sunroof component associated with controlling movement of the first panel 204. In particular, the motor(s) 106 are operatively coupled to at least a portion (e.g., a moveable shoe) of the actuator system 222, for example, via a cable, a belt, etc. that extends from the motor(s) 106 to the portion of the actuator system 222 and is configured to transfer the motor output therebetween.

Figure 3:
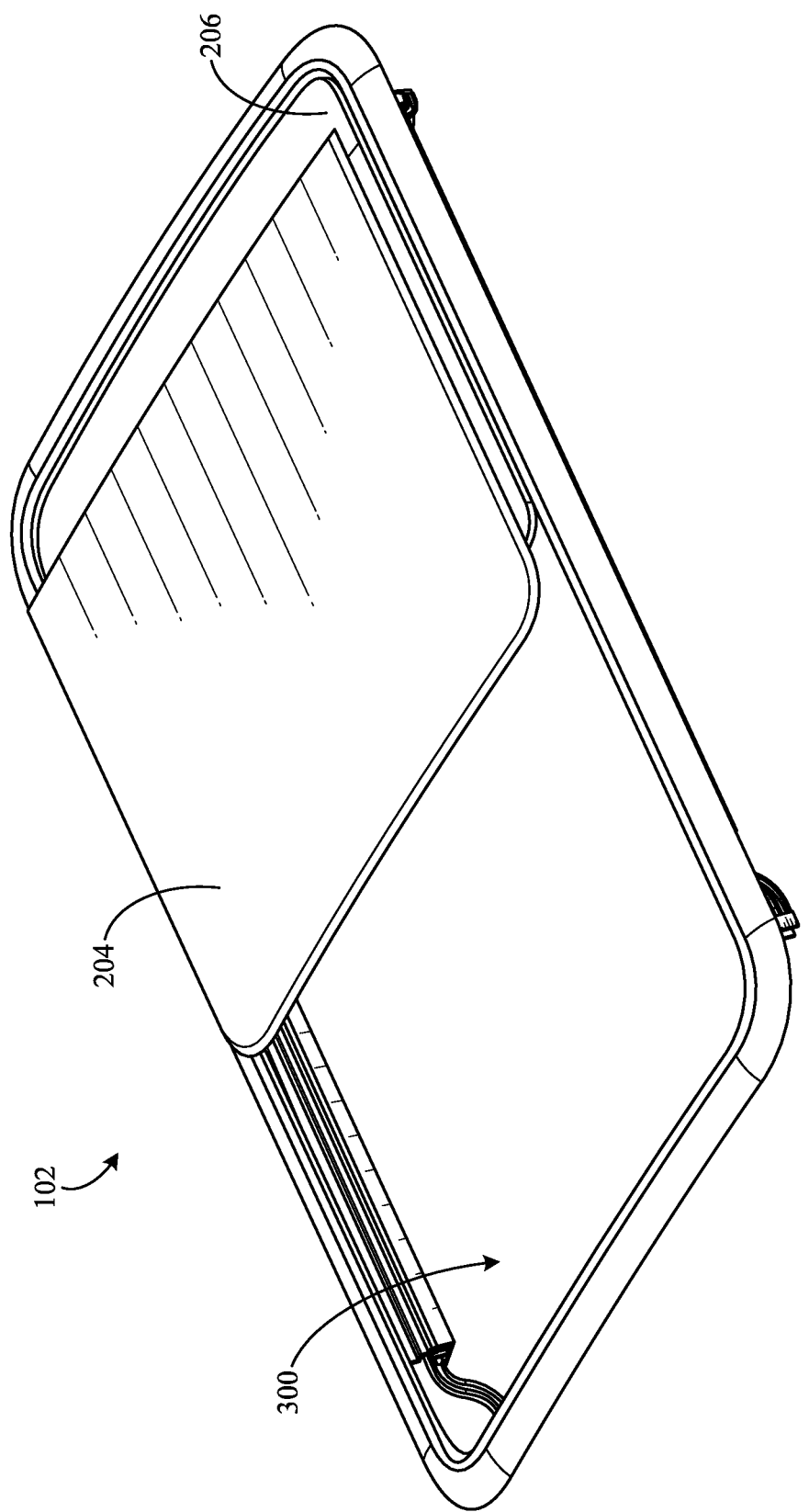
FIG. 3 is a view of the example sunroof of FIG. 2 in an example open state.

FIG. 3 is a view of the sunroof 102 in the open state. When in the open state, the sunroof 102 substantially exposes the vehicle cabin 108 to an outside environment. For example, the fluid(s) may pass into the vehicle cabin 108 through an example opening 300 associated with the sunroof 102 resulting from the first panel 204 moving away from the first position. In particular, the first panel 204 of FIG. 3 is in the second position. Although FIGS. 2 and 3 depict the first panel 204 as movable, in some examples, the second panel 206 is likewise movable to open and/or close the sunroof 102 in addition or alternatively to the first panel 204.

Figure 4:
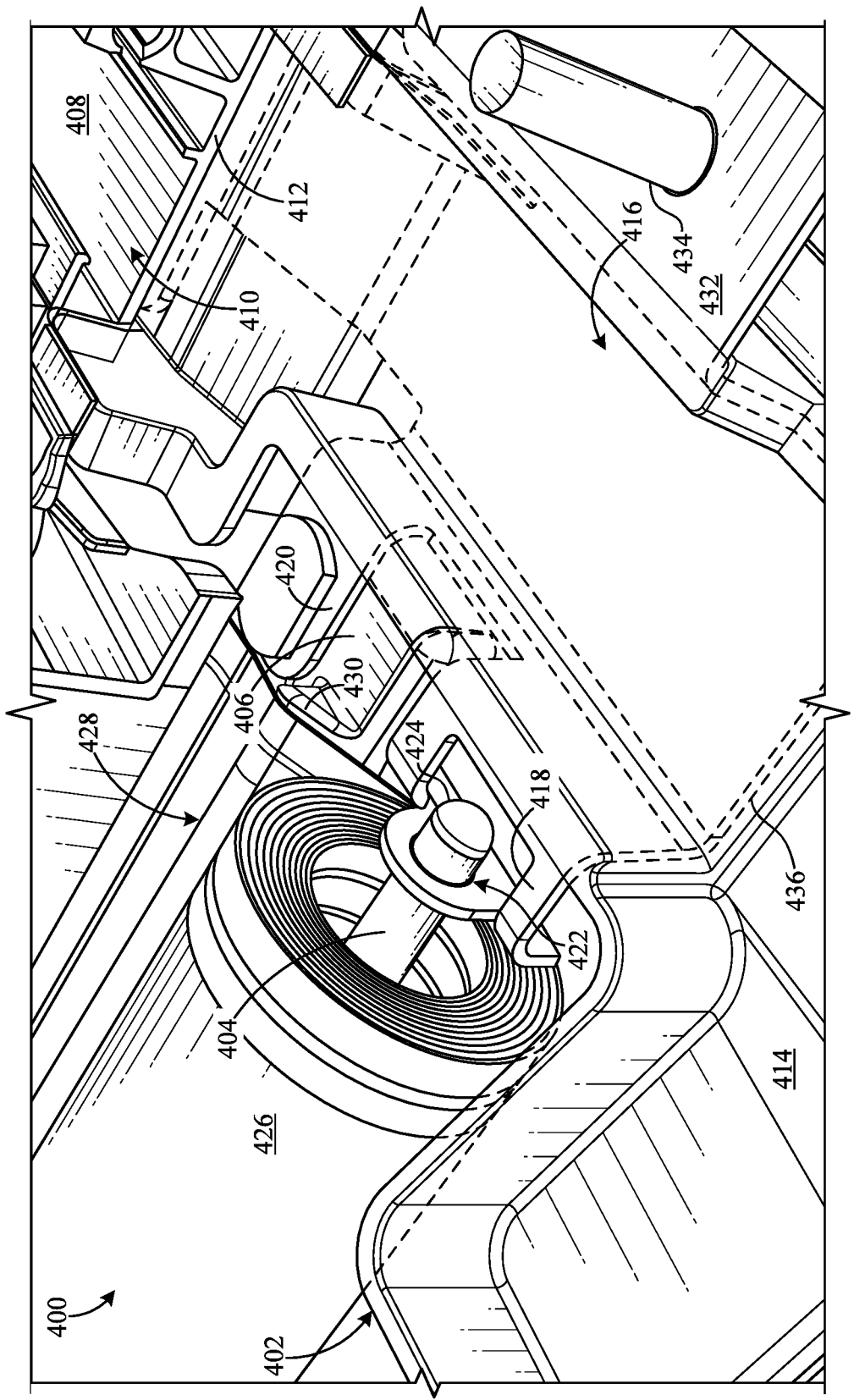
FIG. 4 is view an example assembly for a vehicle sunroof in accordance with the teachings of this disclosure.

FIG. 4 is a view of an example assembly 400 for a vehicle sunroof in accordance with the teachings of this disclosure. In some examples, the assembly 400 of FIG. 4 is used to implement at least a portion of the sunroof 102 of FIGS. 1-3. According to the illustrated example of FIG. 4, the assembly 400 includes a first example sunroof drain (e.g., a rear drain) 402, an example sunshade axle 404, and an example sunshade tensioner 406. In particular, the first sunroof drain 402 is configured to hold the sunshade axle 404 and/or the sunshade tensioner 406, as discussed further below in connection with FIGS. 5-7, 8A, 8B, and 9. As shown in FIG. 4, the first sunroof drain 402 is coupled between and/or interposed between at least a component of the sunroof 102 and the sunshade axle 404 and the sunshade tension 406 such as, for example, an example rail 408 of the sunroof 102. That is, according to the illustrated example of FIG. 4, the drain 402 is supported by the rail 408 and, thus, the sunshade axle 404 and/or the sunshade tensioner 406 is/are supported by the rail 408.

The sunroof rail 408 of FIG. 4 is coupled (e.g., directly and/or via one or more intermediate components) to the vehicle roof 202 to provide support to sunroof rail 408 and, thus, to the sunroof component(s) supported by the sunroof rail 408. In particular, the sunroof rail 408 is configured to receive one or more example movable sunroof components associated with controlling movement of the panel(s) 204, 206 such as, for example, any of one or more panel brackets (e.g., bracket(s) coupled to and/or supporting the panel(s) 204, 206), one or more drive shoes, one or more drive links, etc. As shown in FIG. 4, the rail 408 forms and/or defines one or more examples guide channels 410 that extend at least partially along a length of the rail 408 between a first end 412 of the rail 408 and a second end of the rail 408 opposite the first end 412. In such examples, the movable sunroof component(s) are slidably disposed within the guide channel(s) 410, and the rail 408 guides movement of the component(s) via the guide channel(s) 410. For example, one or more of the components of the sunroof guide system 220 and/or one or more components of the sunroof actuator system 222 is/are positioned in the guide channel(s) 410.

The first drain 402 of FIG. 4 is structured and/or configured to convey one or more fluids (e.g., water) away from the sunroof 102, thereby preventing the fluid(s) from entering the vehicle cabin 108. That is, the first drain 402 prevents the sunroof 102 from leaking. In some examples, the first drain 402 includes a first example body 414 that forms and/or defines a first example fluid cavity 416 to catch the fluid(s). In particular, the first fluid cavity 416 is sized and/or shaped to receive the fluid(s) and drain the fluid(s) therefrom. In some examples, the rail 408 provides the fluid(s) to the first fluid cavity 416 of the first drain 402, for example, during certain weather events and/or weather conditions.

According to the illustrated example of FIG. 4, the sunshade axle 404 and the sunshade tensioner 406 are coupled to the first body 414 and/or, more generally, to the first drain 402, for example, via one or more example fasteners and/or one or more example fastening methods or techniques. In some examples, to facilitate such coupling, the first drain 402 includes one or more example adaptors (e.g., one or more tabs) 418, 420 that are positioned on and/or couple to the first body 414, two of which are shown in this example (i.e., a first adaptor (e.g., a first tab) 418 and a second adaptor (e.g., a second tab) 420). In particular, the first adaptor 418 of FIG. 4 is coupled (e.g., removably coupled) to the sunshade axle 404 to support the sunshade axle 404. As such, the sunshade axle 404 is supported by the first adaptor 418 and/or, more generally, the first drain body 414 and/or the first drain 402. Further, the second adaptor 420 of FIG. 4 is coupled (e.g., removably coupled) to the sunshade tensioner 406 to support the sunshade tensioner 406. As such, the sunshade tensioner 406 is supported by the second adaptor 420 and/or, more generally, the first body 414 and/or the first drain 402.

In some examples, the first adaptor 418 is configured to couple the sunshade axle 404 to the first body 414 and/or decouple the sunshade axle 404 from the first body 414. In some such examples, the first adaptor 418 includes a first example aperture (e.g., a circular opening) 422 positioned thereon through which the sunshade axle 404 is to extend. That is, the first aperture 422 of FIG. 4 is sized and/or shaped to receive a first end 424 of the axle 404. As shown in FIG. 4, the sunshade axle 404 passes through the first aperture 422 and is engaging a surface (e.g., an inner surface) of the first adaptor 418 that forms and/or defines the first aperture 422. As such, the surface of the first adaptor 418 imparts a force or load on the sunshade axle 404, which maintains an orientation and/or a position of the axle 404 relative to the first drain 402. In this manner, the first adaptor 418 supports and/or carries the sunshade axle 404. In some examples, the sunshade axle 404 is rotatable relative to the first adaptor 418 while a position of the sunshade axle 404 relative to the first adaptor 418) is substantially maintained (i.e., the sunshade axle 404 and the first adaptor 418 are rotatably coupled together. That is, in such examples, a surface (e.g., an outer surface) of the axle 404 slidably engages the surface of the first adaptor 418 that forms and/or defines the first aperture 422. However, in some examples, the sunshade axle 404 is fixedly coupled the first adaptor 418 such that the sunshade axle 404 cannot rotate relative to the first adaptor 418.

In some examples, the second adaptor 420 is configured to couple the sunshade tensioner 406 to the first body 414 and/or decouple the sunshade tensioner 406 from the first body 414, as discussed further below in connection with FIG. 6. As shown in FIG. 4, the second adaptor 420 extends over the tensioner 406 such that the second adaptor 420 and the tensioner 406 at least partially overlap with each other.

The sunshade axle 404 of FIG. 4 is configured to carry and/or support an example sunshade (e.g., a fabric and/or a textile) 426 of the sunroof 102. As shown in FIG. 4, the sunshade 426 is wound on and/or otherwise positioned on the axle 404. In particular, the sunshade 426 is configured to unwind and/or wind relative to the axle 404, for example, in response to a user imparting a force (e.g., pulling and/or pushing) on an end of the sunshade 426. Additionally or alternatively, to unwind and/or wind the sunshade 426, the axle 404 is operatively coupled to the motor(s) 106 to receive the output therefrom. For example, the motor(s) 106 impart a force and/or a torque on the axle 404, thereby rotating the axle 404 and, thus, winding and/or unwinding the sunshade 426. In particular, when the sunshade 426 is in an extended position and/or otherwise positioned beneath the sunroof panel(s) 204, 206, the sunshade 426 absorbs, reflects, scatters, and/or otherwise blocks external light, which improves comfort of vehicle occupant(s) during certain vehicle lighting conditions.

To prevent the sunshade 426 from wrinkling and/or otherwise forming wrinkle(s), the sunshade tensioner 406 of FIG. 4 is configured to impart a force or pressure on a portion or area (e.g., a bottommost area) 428 of the sunshade 426. As shown in FIG. 4, the sunshade tensioner 406 includes an oblong body positioned near the sunshade axle 404, for example, such that the oblong body of the sunshade tensioner 406 and the sunshade axle 404 are substantially parallel relative to each other. In some examples, the tensioner 406 includes an example surface (e.g., an outer surface) 430 formed by the oblong body that extends along the sunshade 426 and is engaged with the area 428 of the sunshade 426. In such examples, as a result of the first drain 402 holding the tensioner 406 and the axle 404, the first drain 402 substantially maintains a position of the tensioner 406 relative to the axle 404 and/or an orientation of the tensioner 406 relative to the axle 404, which enables the tensioner 406 to substantially maintain such engagement with the sunshade 426. In this manner, the tensioner 406 provides tension to the sunshade 426 to substantially prevent the sunshade 426 from wrinkling, which may be desirable to vehicle occupant(s).

Additionally or alternatively, in some examples, the first drain 402 is configured to hold an example sunroof housing (e.g., a rear sunroof housing) associated with the sunroof 102. In such examples, to facilitate coupling the sunroof housing to the first body 414, the first drain 402 includes a third example adaptor (e.g., a third tab) 432 positioned on and/or coupled to the first body 414. In such examples, the third adaptor 432 includes one or more example protrusions (e.g., any of one or more pins, one or more bolts, one or more studs, etc.) 434 that are positioned on and/or coupled to the third adaptor 432 and extend away from the third adaptor 432, one of which is shown in this example. The protrusion(s) 434 are configured to receive at least a portion of the sunroof housing. In particular, when the sunroof housing is aligned to the protrusion(s) 434 and/or otherwise positioned on the third adaptor 432, the third adaptor 432 supports and/or carries at least a portion the sunroof housing, and the protrusion(s) 434 maintain a position and/or an orientation of the sunroof housing relative to the drain 402. More generally, in such examples, the body 414 and/or the first drain 402 support and/or carry the sunroof housing.

In some examples, to improve strength and/or rigidity of the first body 414, the first drain 402 includes an example bracket (e.g., sheet metal) 436 that is coupled to the first body 414, for example, via one or more molding methods or techniques (e.g., injection molding). For example, the first body 414 can be overmolded with the bracket 436. In such examples, after the bracket 436 is produced, the bracket 436 is placed in a mold. Then, a first example material (e.g., plastic) is heated and/or injected into the mold with the bracket 436 to substantially form the first body 414. In this manner, disclosed examples couple the first body 414 and the bracket 436 together (e.g., after the first material sufficiently cools). Thus, in some examples, the first body 414 includes and/or is otherwise at least partially constructed of the first material.

Further, at least a portion (e.g., one or more sheets or one or more sheet portions) of the drain bracket 436 of FIG. 4 is positioned within the first drain body 414, as represented by the dotted/dashed lines of FIG. 4. However, in some examples, the drain bracket 436 is positioned on and/or coupled to an outer or exterior surface of the first drain body 414 (i.e., the bracket 436 is not positioned within the first drain body 414).

In some examples, the bracket 436 includes and/or is otherwise at least partially constructed of a second material (e.g., a metal such as steel) that is different from the first material. In particular, the second material is stronger and/or more rigid compared to the first material. However, the first material is less dense compared to the second material. As a result, such a combination of the first and second materials reduces weight of the first drain 402 while enabling the first drain 402 to sufficiently hold one or more (e.g., all) of the axle 404, the tensioner 406, and/or the sunroof housing. Thus, the bracket 436 enables and/or improves such holding functionality associated with the first drain 402.

In some examples, the bracket 436 is produced via one or more example sheet metal forming methods or techniques such as, for example, one or more of bending, flanging, cutting, punching, etc. In particular, in such examples, the bracket 436 is shaped such that the bracket 436 forms and/or defines one or more (e.g., all) of the first adaptor 418, the second adaptor 420, and/or the third adaptor 432, as shown in FIG. 4. That is, in such examples, the bracket 436 and/or at least a portion thereof is curved and/or angled such as, for example, the first portion 514 of FIG. 5 and/or the second portion 802 of FIG. 8. As such, the bracket 436 of FIG. 4 is configured to hold one or more (e.g., all) of the sunshade axle 404, the sunshade tensioner 406, and/or the sunroof housing.

Figure 5:
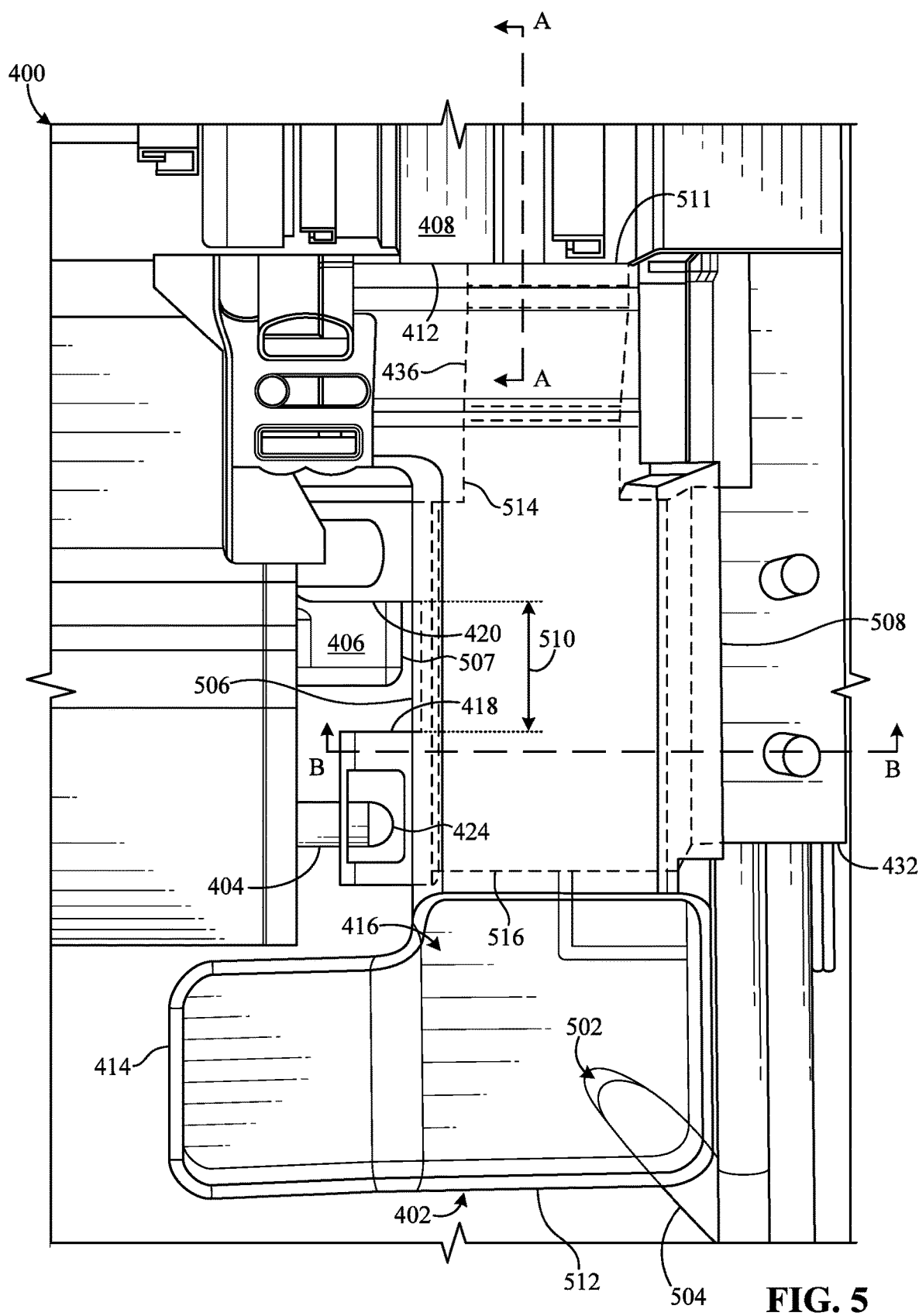
FIG. 5 is a top-view of the example assembly of FIG. 4 and shows an example sunroof drain in accordance with the teachings of this disclosure.

FIG. 5 is a top-view of the assembly 400 and shows the first sunroof drain 402. According to the illustrated example of FIG. 5, the first drain 402 includes an example outlet 502 that is positioned on the first body 414 and in fluid communication with the first fluid cavity 416. In other words, the outlet 502 is fluidly coupled to the fluid cavity 416. In some examples, the outlet 502 includes a recessed area and/or an aperture defined by the first body 414. In particular, the outlet 502 of FIG. 5 is configured to drain the fluid(s) from the first fluid cavity 416 when the fluid(s) are in the first fluid cavity 416.

Additionally, in some examples, the first drain 402 includes an example fluid line (e.g., a tube, a pine, a channel, etc.) 504 that is fluidly coupled to the outlet 502 and configured to receive the fluid(s) from the outlet 502, which facilitates flowing the fluid(s) away the sunroof 102 and/or away from an interior of the vehicle 100. For example, the fluid line 504 extends through and/or along at least a portion of the vehicle 100 (e.g., a pillar) from the fluid cavity 416 to an exterior of the vehicle 100. In particular, the fluid line 504 conveys the fluid(s) therethrough and expels the fluid(s) via an outlet of the fluid line 504.

In some examples, the first adaptor 418 and/or the second adaptor 420 are positioned on and/or project from a first side 506 of the first body 414 near the first fluid cavity 416, as shown in FIG. 5. That is, the first adaptor 418 extends away from the first side 506 of the first body 414 to support the first end 424 of the sunroof axle 404. Further, the second adaptor 420 extends away from the first side 506 of the first body 414 to support a first end 507 of the sunshade tensioner 406. Additionally, in some examples, the third adaptor 432 of FIG. 5 is positioned on and/or projects from a second side 508 of the first body 414, opposite the first side 506, near the first fluid cavity 416. That is, the third adaptor 432 extends away from the second side 508 of the body 414 to support the sunroof housing. Further, in some examples, the first adaptor 418 and the second adaptor 420 are spaced from each other by an example distance 510. Although FIGS. 4 and 5 depict the first adaptor 418 and the second adaptor 420 as separate adaptors, in some examples, the first adaptor 418 and the second adaptor 420 form a single or integral adaptor (e.g., a single tab). Further, in some such examples, the distance 510 between the first and second adaptors 418, 420 is substantially zero such that the first and second adaptors 418, 420 are proximate to and/or contacting each other.

As shown in FIG. 5, the first drain body 414 extends along (e.g., over and/or under) the bracket 436 and away from sunroof rail 408, for example, from a first end 511 of the first drain body 414 to a second end 512 of the first drain body 414 opposite the first end 511. As shown in FIG. 5, the first end 511 of the first drain body 414 is contacting and/or positioned proximate to the first end 412 of the rail 408. In particular, in such examples, the bracket 436 includes the aforementioned first example portion (e.g., a sheet or a sheet portion) 514 that at least partially overlaps with the first drain body 414, as represented by the dotted/dashed lines of FIG. 5. The first portion 514 of the bracket 436 of FIG. 5 defines a first end 516 of the bracket 436. In some examples, the bracket 436 extends away from the first drain body 414 along at least a portion of the rail 408, which facilitates coupling the bracket 436 and the rail 408 together, as discussed further below in connection with FIG. 8.

Although FIGS. 4 and 5 depict the bracket 436 defining and/or otherwise including the first adaptor 418, the second adaptor 420, the third adaptor 432, and the first portion 514, in some examples, the bracket 436 is implemented differently. In some examples, the bracket 436 is implemented using only one of the first adaptor 418, the second adaptor 420, the third adaptor 432, the first portion 514, or a combination thereof.

Figure 6:
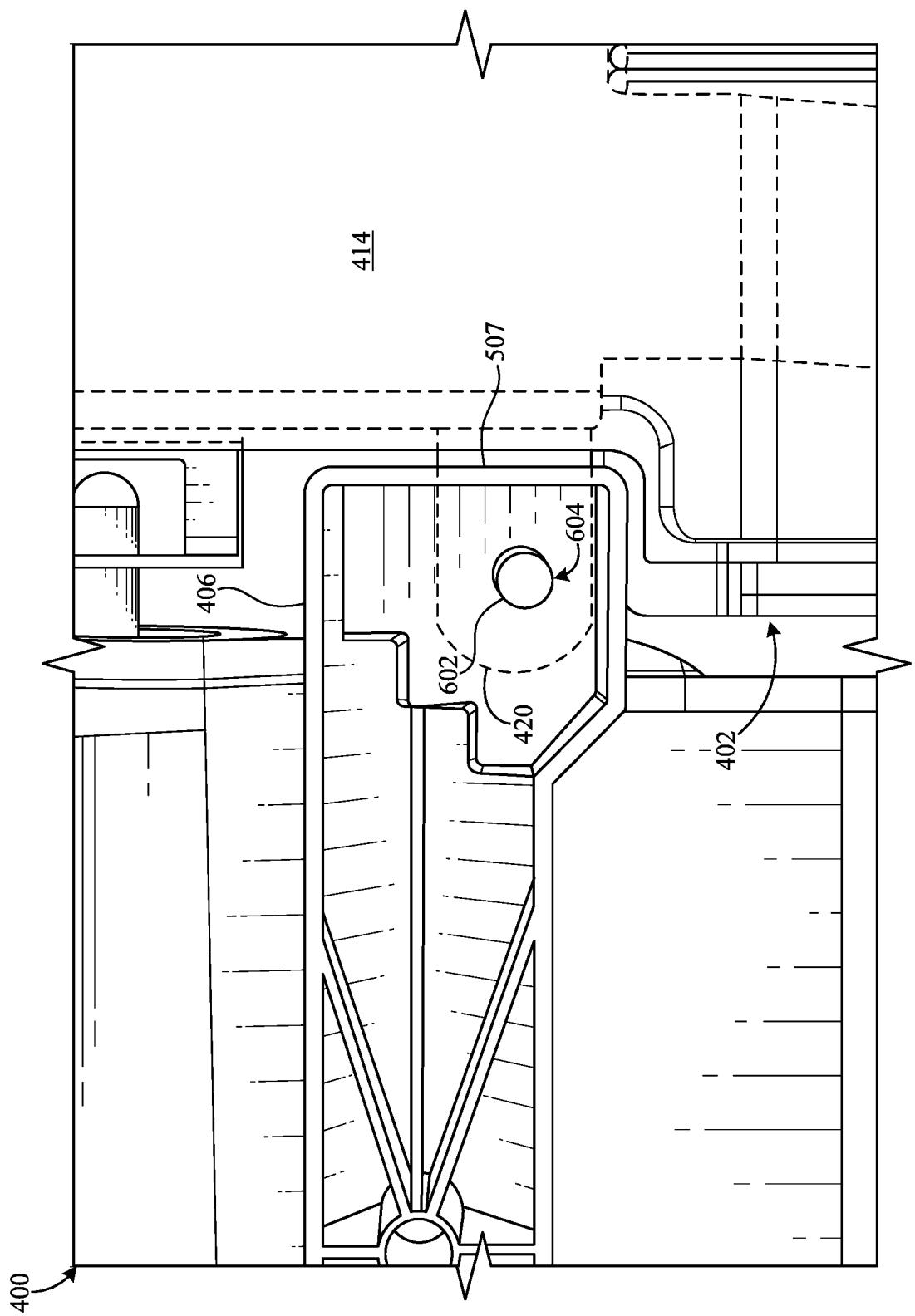
FIG. 6 is a bottom-view of the example assembly of FIG. 4 and shows an example fastener associated with coupling a sunshade tensioner to an example sunroof drain.

FIG. 6 is bottom-view of the assembly 400 and shows an example fastener 602 associated with coupling the sunshade tensioner 406 to the first sunroof drain 402. That is, in such examples, the first drain 402 and/or, more generally, the sunroof assembly 400 includes the fastener 602. The fastener 602 of FIG. 6 can be implemented, for example, using one or more of, a bolt, a stud, a rivet, a screw, etc. According to the illustrated example of FIG. 6, the tensioner 406 includes a second example aperture (e.g., a circular opening) 604 positioned thereon near the first end 507 of the tensioner 406. The second aperture 604 of FIG. 6 is sized and/or shaped to receive the fastener 602.

In some examples, to assemble the tensioner 406 and the first drain 402, a portion of the tensioner 406 near the first end 507 is first aligned to a surface of the second adaptor 420. Then, the fastener 602 is inserted to and/or otherwise positioned in the second aperture 604 such that the fastener 602 extends through the second aperture 604 (i.e., through the tensioner 406) and at least partially into the second adaptor 420, which couples the tensioner 406 to the second adaptor 420 and/or vice versa in some examples. As a result, the first drain body 414 provides support to and/or secures the first end 507 of the tensioner 406. Further, in some such examples, the fastener 602 includes a threaded outer surface that engages a threaded inner surface of the second adaptor 420. Further still, in some such examples, a threaded nut may be positioned on an end of the fastener 602 such that the nut is coupled to the fastener 602 and engaging a surface of the tensioner 406, which facilitates securing the first end 507 to the first body 414 and/or disassembling the tensioner 406 and the first drain 402.

Conversely, in some examples, to dissemble the tensioner 406 and the first drain 402, the nut is first removed and/or decoupled from the fastener 602. Then, the first end 507 of the tensioner 406 is moved away from the second adaptor 420 and/or the fastener 602 such that the fastener 602 exits the second aperture 604. Although FIGS. 4-6 depict aspects in connection with the first sunroof drain 402, in some examples, such aspects likewise apply to one or more other sunroof drains such as, for example, the second sunroof drain 702 of FIG. 7, as discussed further below in connection with FIG. 7.

Figure 7:
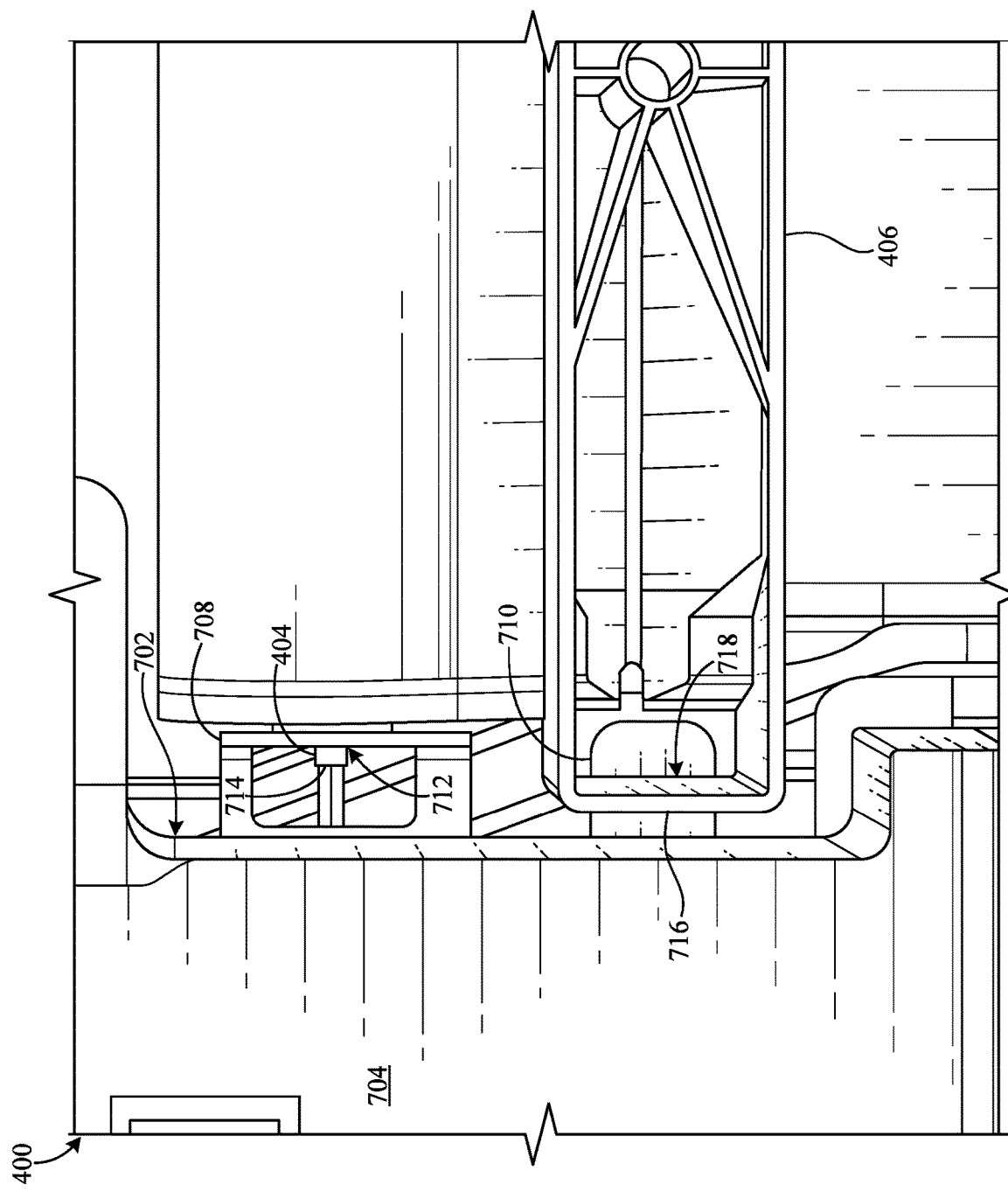
FIG. 7 is an enlarged partial-view of another example sunroof drain in accordance with the teachings of this disclosure.

FIG. 7 is an enlarged partial-view of the aforementioned second sunroof drain 702. That is, in some examples, the sunroof assembly 400 includes the second sunroof drain 702, which may be substantially similar relative to the first drain 402. In particular, the second sunroof drain 702 is configured to hold one or more of the sunshade axle 404, the sunshade tensioner 406, and/or the sunroof housing (e.g., cooperatively with the first sunroof drain 402). The second drain 702 of FIG. 7 includes a second example body 704 that forms and/or defines a second example fluid cavity (not shown), which further facilitates conveying the fluid(s) away from the vehicle sunroof 102. In some examples, the second sunroof drain 702 is coupled between and/or interposed between at least a support component (e.g., a sunroof rail) of the sunroof 102 and the sunshade axle 404 and the sunshade tension 406 such that the support component supports the second drain 702.

According to the illustrated example of FIG. 7, the sunshade axle 404 and the sunshade tensioner 406 are coupled to the second body 704 of the second drain 702, for example, via one or more example fasteners and/or one or more example fastening methods or techniques. In some examples, to facilitate coupling the sunshade axle 404 and/or the sunshade tensioner 406 to the second body 704, the second drain 702 includes one or more example adaptors (e.g., one or more tabs) 708, 710 that are positioned on and/or coupled to the second body 704, two of which are shown in this example (i.e., a fourth adaptor 708 and a fifth adaptor 710). In particular, the fourth adaptor 708 of FIG. 7 is coupled (e.g., removably coupled) to the sunshade axle 404 to support the sunshade axle 404. As such, the sunshade axle 404 of FIG. 7 is supported by the fourth adaptor 708 and/or, more generally, the second drain body 704 and/or the second drain 702. Further, the fifth adaptor 710 of FIG. 7 is coupled (e.g., removably coupled) to the sunshade tensioner 406 to support the sunshade tensioner 406. As such, the sunshade tensioner 406 is supported by the second adaptor 420 and/or, more generally, the second body 704 and/or the second drain 702.

As such, in some examples, the sunshade axle 404 is coupled (e.g., removably coupled) between and/or interposed between the first adaptor 418 and the fourth adaptor 708, which provides better support to the sunshade axle 404 compared to a single adaptor 418, 708. However, in some examples, the sunshade axle 404 is coupled to the first adaptor 418 or the fourth adaptor 708.

In some examples, the fourth adaptor 708 is configured to couple the sunshade axle 404 to the second body 704 and/or decouple the sunshade axle 404 from the second body 704. In such examples, the fourth adaptor 708 forms and/or defines a third example aperture (e.g., a circular opening) 712 through which the sunshade axle 404 is to extend. That is, the third aperture 712 of FIG. 7 is sized and/or shaped to receive a second end 714 of the axle 404 opposite the first end 424 of the axle 404. As such, in some examples, the axle 404 extends from the first adaptor 418 to the fourth adaptor 708 from the first end 424 to the second end 714. As shown in FIG. 7, the sunshade axle 404 passes through the third aperture 712 and is engaging a surface (e.g., an inner surface) of the fourth adaptor 708 that forms and/or defines the third aperture 712. In this manner, the fourth adaptor 708 supports and/or carries the sunshade axle 404. In some examples, the sunshade axle 404 is rotatable relative to the fourth adaptor 708 while substantially maintaining an orientation and/or a position of the sunshade axle 404 relative to the fourth adaptor 708 (e.g., the sunshade axle 404 and the fourth adaptor 708 are rotatably coupled together). However, in some examples, the sunshade axle 404 is fixedly coupled the fourth adaptor 708 such that the sunshade axle 404 cannot rotate relative to the fourth adaptor 708.

In some examples, the fifth adaptor 710 is configured to couple the sunshade tensioner 406 to the second body 704 and/or decouple the sunshade tensioner 406 from the second body 704. As shown in FIG. 7, the fifth adaptor 710 extends away from second drain body 704 and through the tensioner 406 to support a second end 716 of the tensioner 406 opposite the first end 507. In such examples, the tensioner 406 includes a fourth example aperture (e.g., a slot or an elongated opening) 718 that is positioned thereon at or near the second end 716 and sized and/or shape to receive the fifth adaptor 710.

As such, in some examples, the sunshade tensioner 406 is coupled (e.g., removably coupled) between and/or interposed between the second adaptor 420 and the fifth adaptor 710, which provides better support to the sunshade tensioner 406 compared to a single adaptor 420, 710. That is, the tensioner 406 extends between the second adaptor 420 and the fifth adaptor 710 from the first end 507 to the second end 716. However, in some examples, the sunshade axle 404 is coupled to the second adaptor 420 or the fifth adaptor 710. Additionally, in some examples, to improve strength and/or rigidity of the second body 704, the second drain 702 includes an example bracket (e.g., sheet metal) (not shown) that is coupled to the second body 704, similar to the bracket 436 of the first drain 402.

FIGS. 8A and 8B are cross-sectional views of the first sunroof drain 402 of FIG. 5 along line A-A. According to the illustrated example of FIG. 8A, the drain bracket 436 includes the aforementioned second example portion (e.g., a sheet or a sheet portion) 802 that is connected to the first portion 514 and extends along a portion (e.g., a sheet or sheet portion) 804 of the sunroof rail 408. As shown in FIG. 8A, the first portion 514 of the bracket 436 is positioned beneath the portion 804 of the rail 408. In particular, the second portion 802 of the drain bracket 436 is coupled to the portion 804 of the sunroof rail 408.

In some examples, the bracket 436 and the rail 408 are coupled together via one or more example clinching or press-forming methods or techniques, which reduce costs and/or increases production time associated with coupling the bracket 436 and the rail 408 together. In such examples, one or more tools (e.g., a press or punch, a die, etc.) interact with one or more areas 806 of the bracket 436 and one or more areas 808 of the rail 408 proximate to the second portion 802. The areas 806 of the bracket 436 correspond to ones or more surfaces of the second bracket portion 802, and the areas 808 of the rail 408 correspond to one or more surfaces of the rail portion 804. In particular, the tool(s) impart a force or load on the area(s) 806, 808. As a result, the bracket 436 and the rail 408 form and/or define one or more example joints (e.g., one or more clinched joints such as round joint(s), square joint(s), etc.) 810, 812 that couple the bracket 436 and the rail 408 together, two of which are shown in this example (i.e., a first joint 810 and a second joint 812). That is, the joint(s) 810, 812 of FIG. 8A substantially prevent the bracket 436 and the rail 408 from separating without requiring any additional fasteners, adhesive(s), welding, etc. Such joint(s) 810, 812 also increase strength and/or rigidity of the first drain 402. As a result, in such examples, the first drain body 414, the drain bracket 436, and/or, more generally, the first drain 402 is/are supported by the sunroof rail 408 (i.e., supported by a component of the vehicle sunroof 102). Although FIG. 8A depicts the drain bracket 436 particularly coupled to the sunroof rail 408, in some examples, the drain bracket 436 is likewise coupled to one or more other components of the vehicle sunroof 102 in addition or alternatively to the sunroof rail 408

As shown in FIG. 8A, the second portion 802 of the bracket 436 defines a second end 814 of the bracket 436 opposite the first end 516 of the bracket 436. In some examples, the bracket 436 includes a thickness 816 that is substantially uniform across the bracket 436, for example, from the first end 516 to the second end 814. That is, the thickness 816 may slightly vary (e.g., by about +/−15% of an appropriate value corresponding to a desired thickness) from the first end 516 (i.e., the first sheet portion 514) to the second end 814 (i.e., the second sheet portion 802) for areas of the second portion 802 that do not include the joint(s) 810, 812. Additionally, in some such examples, the sunroof rail 408 has a thickness 818 that is substantially uniform across the portion 804 of the sunroof rail 408, for example, from the first end 412 of the rail 408 to a second end of the rail 408 opposite the first end 412. That is, the thickness 818 may slightly vary (e.g., by about +/−15% of an appropriate value corresponding to a desired thickness) from the first end 412 to the second end of the rail 408 for areas of the portion 804 that do not include the joint(s) 810, 812. As a result, such uniform thicknesses 816, 818 enable and/or facilitate coupling the rail 408 and the bracket 436 together in the above disclosed manner.

According to the illustrated example of FIG. 8B, the second joint 812 is a round clinched joint. In such examples, the second joint 812 includes an example neck 820 that is formed by first bracket portion 802 and/or the rail portion 804. In particular, performance of the second joint 812 is substantially based on one or more parameters of the neck 820 such as, for examples, one or more a width or thickness, an undercut, etc. As such, the parameter(s) of the neck 820 are advantageously designed, predefined, and/or otherwise configured such that a coupling strength of the second joint 812 is sufficient. Although FIGS. 8A and 8B depict each of the joint(s) 810, 812 as a round clinched joint, in some examples, one or more of the joint(s) 810, 812 is/are implemented differently. Further, although FIG. 8B depicts aspects in connection with the second joint 812, such aspects likewise apply to one or more other joints associated with the bracket 436 and the rail 408 such as, for example, the first joint 810.

Figure 9:
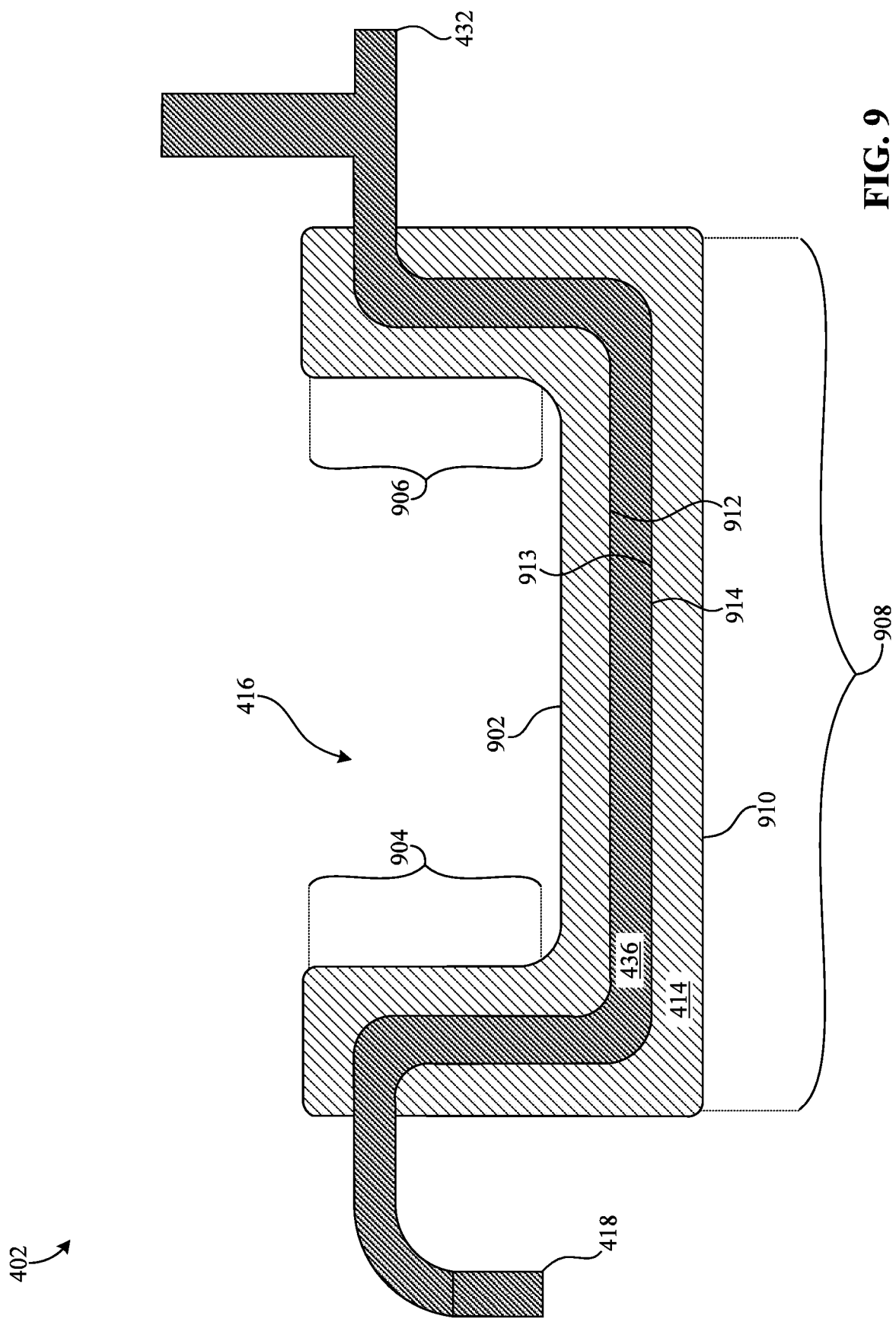
FIG. 9 is a cross-sectional view of the example sunroof drain of FIG. 5 along line B-B.

FIG. 9 is a cross-sectional view of the first sunroof drain 402 of FIG. 5 along line B-B. According to the illustrated example of FIG. 9, the bracket 436 extends through the first body 414 proximate to a surface (e.g., an outer surface) 902 of the first body 414 that forms and/or defines the fluid cavity 416. In some examples, the first body 414 includes a first example wall portion 904, a second example wall portion 906, and an example base portion 908 interposed between the first and second wall portions 904, 906. As shown in FIG. 9, the first and second wall portions 904, 906 extend away from the base portion 908 substantially parallel relative to each other such that the first and second wall portions 904, 906 and the base portion 908 at least partially form and/or define the first fluid cavity 416. In particular, in such examples, the bracket 436 and/or the first portion 514 thereof extends through the first wall portion 904, the second wall portion 906, and the base portion 908 substantially between the first surface 902 of the first body 414 and a second surface (e.g., an outer surface) 910 of the first body 414 opposite the first surface 902. As shown in FIG. 9, the bracket 436 extends from the third adaptor 432 to the first adaptor 418 (and/or to the second adaptor 420). As such, in some examples, each of the first portion 514 and/or the second portion 802 of the bracket 436 is curved, angled, and/or otherwise shaped to conform to a shape of the drain body 414. In this manner, the bracket further improves strength, rigidity, and/or durability of the first body 414 and/or, more generally, the first drain 402.

In some examples, the first drain body 414 is shaped to conform to the bracket 436. For example, as shown in FIG. 9, the first drain body 414 includes a third surface (e.g., an inner surface) 912 and/or a fourth surface 913 that conform to and/or match a surface (e.g., an outer surface) 914 of the bracket 436. In such examples, the third surface 912, the fourth surface 913, and the surface 914 of the bracket 436 are engaged with each other and/or maintain such engagement, which improves strength, rigidity, and/or durability of the first drain 402. In such examples, the bracket 436 and/or the first portion 514 thereof extend through the first drain body 414 between the third and fourth surfaces 912, 913 of the first drain body 414. That is, the third and fourth surfaces 912, 913 oppose and/or face each other. As such, the third and fourth surfaces 912, 913 are sometimes referred to as opposing surfaces of the first drain body 414.

Although FIGS. 8A, 8B, and 9 depict aspects in connection with the first drain 402, in some examples, such aspects likewise apply to one or more other sunroof drains such as, for example, the second drain 702.

As used herein, the terms "Including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended. Further, when used in connection with multiple elements, the term "and/or" refers to any combination of the elements. For example, the form A, B, and/or C refers to any of: (1) A alone; (2) B alone; (3) C alone; (4) A and B; (5) A and C; (6) B and C; or (7) A, B, and C.

It will be appreciated that the systems, apparatus, and methods disclosed in the foregoing description provide numerous advantages. Examples disclosed herein incorporate holding functionality into a sunroof drain such that the sunroof drain is structured and/or configured to hold one or more of a sunshade axle, a sunshade tensioner, and/or a sunroof housing. Disclosed examples reduce costs and/or production time typically associated with coupling such sunroof components together and/or otherwise securing the sunroof component(s).

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An assembly for a vehicle sunroof, comprising:
   a sunshade axle configured to receive a sunshade; and
   a sunroof drain supported by a component of the vehicle sunroof and configured to convey a fluid away from at least a rail of the vehicle sunroof, the sunroof drain including a body that defines a fluid cavity and including a bracket coupled to the body and configured to hold the sunshade axle, the body extending from a first end at the rail to a second end and the bracket extending along with the body from the first end to an end portion adjacent to the sunshade.

2. The assembly of claim 1, wherein the bracket defines a tab extending away from a side of the body at the end portion of the bracket to support an end of the sunshade axle.

3. The assembly of claim 2, wherein the tab includes an aperture positioned thereon, the sunshade axle to extend through the aperture and engage a surface of the tab that forms the aperture.

4. The assembly of claim 1, wherein the body includes plastic and the bracket includes steel.

5. The assembly of claim 1, wherein the bracket extends away from the body along at the first end along a portion of the rail, the bracket and the rail forming one or more clinched joints that couple the bracket to the rail.

6. The assembly of claim 1, wherein the bracket has a thickness that is substantially uniform across the bracket.

7. The assembly of claim 1, wherein the bracket includes a sheet portion that is positioned within the body.

8. The assembly of claim 7, wherein the sheet portion of the bracket extends through the body between opposing surfaces of the body.

9. The assembly of claim 7, wherein the sheet portion is curved or angled.

10. The assembly of claim 1, further including a sunshade tensioner configured to impart a pressure on the sunshade, the bracket configured to hold the sunshade tensioner.

11. The assembly of claim 10, wherein the bracket defines a tab extending away from a side of the body to support an end of the sunshade tensioner.

12. The assembly of claim 1, wherein the bracket is configured to hold a sunroof housing.

13. The assembly of claim 1, wherein the bracket is incorporated into the body.

\* \* \* \* \*